(12) United States Patent
Park et al.

(10) Patent No.: US 11,735,989 B2
(45) Date of Patent: Aug. 22, 2023

(54) ELECTRIC MOTOR AND COMPRESSOR HAVING ELECTRIC MOTOR

(71) Applicant: LG ELECTRONICS INC., Seoul (KR)

(72) Inventors: Junseong Park, Seoul (KR); Euisuk Jung, Seoul (KR); Seungjin Oh, Seoul (KR); Hajeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 423 days.

(21) Appl. No.: 17/037,129

(22) Filed: Sep. 29, 2020

(65) Prior Publication Data

US 2021/0218323 A1 Jul. 15, 2021

(30) Foreign Application Priority Data

Jan. 10, 2020 (KR) .................. 10-2020-0003889

(51) Int. Cl.
*H02K 17/08* (2006.01)
*F25B 31/02* (2006.01)
*H02K 17/16* (2006.01)

(52) U.S. Cl.
CPC ........... *H02K 17/08* (2013.01); *F25B 31/026* (2013.01); *H02K 17/165* (2013.01)

(58) Field of Classification Search
CPC ...... H02K 17/08; H02K 17/165; H02K 11/27; H02K 2213/09; H02K 3/20; H02K 3/28; H02K 3/505; H02K 2213/03; F25B 31/026; F04B 17/042
See application file for complete search history.

(56) References Cited

U.S. PATENT DOCUMENTS

| | | | |
|---|---|---|---|
| 2009/0214363 A1* | 8/2009 | Noh ................. | H02K 17/08 310/198 |
| 2015/0180384 A1* | 6/2015 | An ................... | H02M 5/44 318/400.3 |
| 2020/0144951 A1* | 5/2020 | Nigo ............... | F25B 49/025 |

FOREIGN PATENT DOCUMENTS

| | | | |
|---|---|---|---|
| JP | H08-126363 | | 5/1996 |
| JP | 9-250484 | | 9/1997 |
| JP | 2008022665 A | * | 1/2008 |
| JP | 2015409732 | | 6/2015 |

(Continued)

OTHER PUBLICATIONS

JP2008022665A English translation (Year: 2023).*
JP2015109732A English translation (Year: 2023).*
Korean Office Action dated Feb. 16, 2021.

*Primary Examiner* — Christopher M Koehler
*Assistant Examiner* — Viswanathan Subramanian
(74) *Attorney, Agent, or Firm* — KED & Associates LLP

(57) ABSTRACT

An electric motor and a compressor having an electric motor are disclosed herein. The electric motor may include a stator having a stator core and a stator coil, and a rotor provided with a rotational shaft and rotatably disposed with respect to the stator. The stator coil may include a main winding and an auxiliary winding connected to each other with a phase difference. The main winding may be divided into a plurality of main windings so as to be connected to each other and disconnected from each other, and the stator coil may further include a winding changeover switch configured to provide connection and disconnection between the plurality of main windings. Such a configuration may allow operating efficiency at a low load to be increased.

19 Claims, 12 Drawing Sheets

(56) References Cited

FOREIGN PATENT DOCUMENTS

KR        10-0885447         2/2009
KR    10-2009-0126595     12/2009

* cited by examiner

| | WIRE DIAMETER | NUMBER OF TURNS |
|---|---|---|
| MAIN WINDING | Φ1.00 | 162 |
| AUXILIARY WINDING | Φ1.15 | 80 |

FIG. 9

|  | WIRE DIAMETER | NUMBER OF TURNS |
|---|---|---|
| MAIN WINDING | φ0.95 | 176 |
| AUXILIARY WINDING | φ1.10 | 86 |

FIG. 10

|  | WIRE DIAMETER | NUMBER OF TURNS |
|---|---|---|
| FIRST MAIN WINDING (N1) | 0.95 | 159 |
| SECOND MAIN WINDING (N2) | 0.95 | 17 |

| | WIRE DIAMETER | NUMBER OF TURNS |
|---|---|---|
| FIRST MAIN WINDING (N1a) | 0.95 | 124 |
| SECOND MAIN WINDING (N2a) | 0.95 | 52 |

|  | WIRE DIAMETER | NUMBER OF TURNS |
|---|---|---|
| FIRST MAIN WINDING (N1b) | 0.95 | 132 |
| SECOND MAIN WINDING (N2b) | 0.95 | 44 |

|  | WIRE DIAMETER | NUMBER OF TURNS |
|---|---|---|
| FIRST MAIN WINDING (N1c) | 0.95 | 141 |
| SECOND MAIN WINDING (N2c) | 0.95 | 35 |

|  | WIRE DIAMETER | NUMBER OF TURNS |
|---|---|---|
| FIRST MAIN WINDING (N1d) | 0.95 | 150 |
| SECOND MAIN WINDING (N2d) | 0.95 | 26 |

|  | WIRE DIAMETER | NUMBER OF TURNS |
|---|---|---|
| FIRST MAIN WINDING (N1e) | 0.95 | 167 |
| SECOND MAIN WINDING (N2e) | 0.95 | 9 |

US 11,735,989 B2

ELECTRIC MOTOR AND COMPRESSOR HAVING ELECTRIC MOTOR

CROSS-REFERENCE TO RELATED APPLICATION(S)

Pursuant to 35 U.S.C. § 119(a), this application claims the benefit of the earlier filing date and the right of priority to Korean Patent Application No. 10-2020-0003889, filed in Korea on Jan. 10, 2020, the contents of which are incorporated by reference herein in their entirety.

BACKGROUND

1. Field

An electric motor and a compressor having an electric motor are disclosed herein.

2. Background

An electric motor is an apparatus that converts electrical energy into mechanical energy and is well known. Electric motors may be classified by power source type into a direct current (DC) electric motor and an alternating current (AC) electric motor.

The AC electric motor is widely used as it has advantages of a simple structure, a small and light weight, and requires no consumable mechanical components, such as a brush and a commutator. However, a method of controlling the AC electric motor is more complicated than that of the DC electric motor.

The AC electric motor is generally divided into a single-phase motor and a three-phase motor, and may also be classified into an induction motor, a synchronous motor, and a commutator motor according to a type of rotor. Among others, a single-phase induction motor with a relatively small output has a simple structure, ease of operation, and low cost. The single-phase induction motor is widely used as a motor for a compressor.

However, such a related art single-phase induction motor has a problem in that operating efficiency may be reduced due to an irregular winding structure, an unbalanced magnetic field caused by a condenser, and/or a loss and slip caused by secondary resistance. In particular, in a compressor having the conventional electric motor (single-phase induction motor), improvement in operating efficiency under an actual load is required.

In some electric motors, a switch and a plurality of capacitors are provided such that different capacitors are operated at a startup, low-load (condition), and high-load (condition). However, this may lead to a complicated configuration and an increase in cost.

Further, in some other electric motors, a plurality of operating condensers (capacitors) and an electronic switch configured to change a capacity of the operating condensers are provided. This may result in a complicated circuit configuration and increased manufacturing cost.

BRIEF DESCRIPTION OF THE DRAWINGS

Embodiments will be described in detail with reference to the following drawings in which like reference numerals refer to like elements, and wherein:

FIG. 9 illustrates a configuration of the stator coil of the electric motor of FIG. 1;

FIG. 10 illustrates a specific configuration of a main winding of the stator coil of the electric motor in FIG. 1;

DETAILED DESCRIPTION

Figure 1:
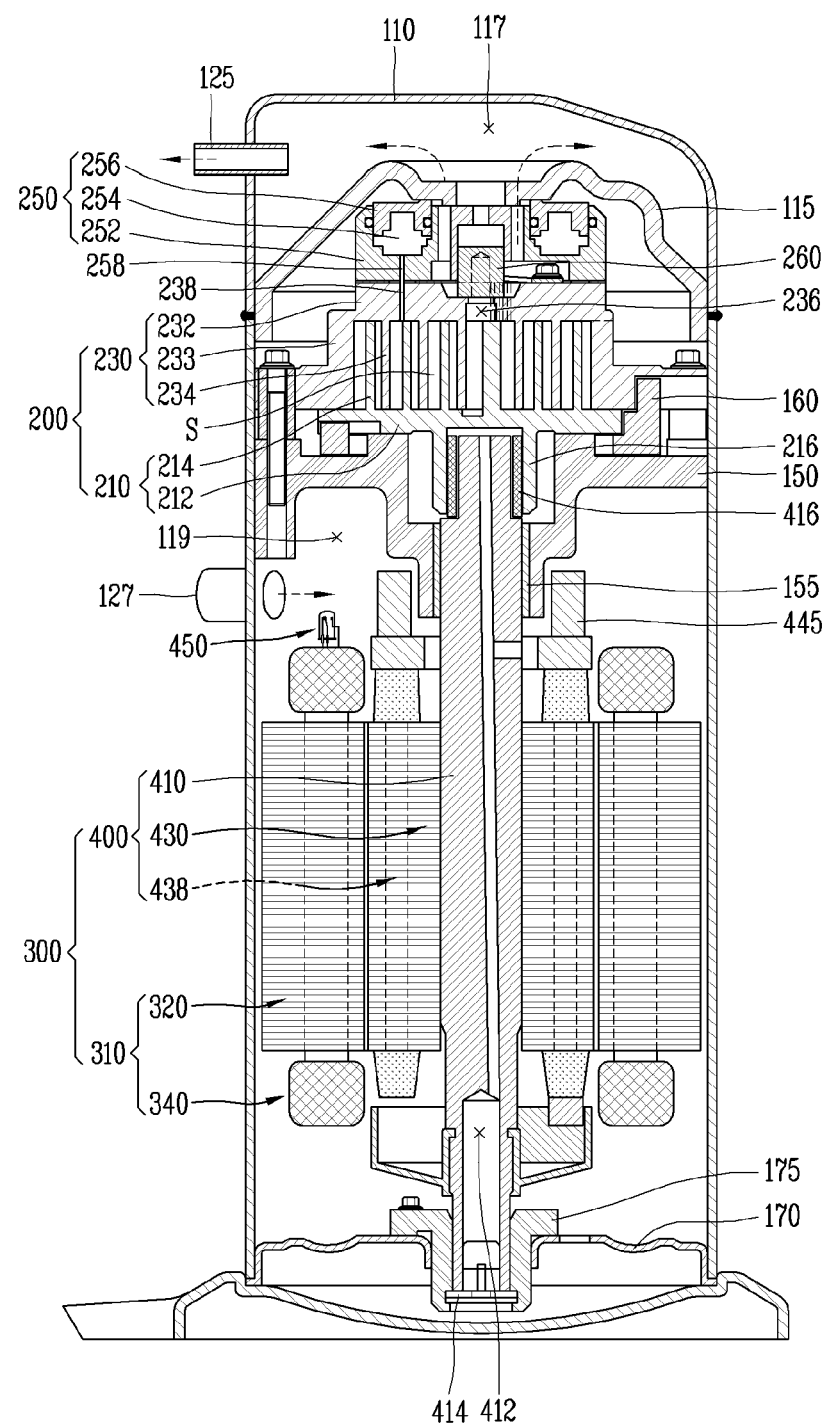
FIG. 1 is a cross-sectional view of a compressor having an electric motor according to an embodiment.

Hereinafter, embodiments will be described with reference to the accompanying drawings. Herein, like reference numerals denote like elements even in different embodiments, and a description for an element appearing first will replace descriptions for like elements appearing later. As used herein, the singular forms "a," "an," and "the" are intended to include the plural forms as well unless the context clearly indicates otherwise. In describing embodiments disclosed in the specification, moreover, description will be omitted when a specific description for publicly known technologies to which the disclosure pertains is judged to obscure the main point of the embodiments disclosed in the specification. Also, it should be noted that the accompanying drawings are merely illustrated to easily understand the embodiment disclosed in the specification, and therefore, they should not be construed to limit the technical spirit disclosed in the specification.

FIG. 1 is a cross-sectional view of a compressor having an electric motor according to an embodiment. As illustrated in FIG. 1, a compressor having an electric motor according to this embodiment may include a case 110, a compression unit 200, and an electric motor 300.

A sealed (or closed) inner space is formed inside of the case 110. The case 110 may be provided therein with a high and low pressure separation plate 115 that partitions or divides the inner space of the case 110, for example. In the inner space of the case 110, a discharge space 117 may be provided at an upper side of the high and low pressure separation plate 115, and a suction space 119 may be provided at a lower side of the high and low pressure separation plate 115.

A compressed (or pressurized) refrigerant may be discharged from the discharge space 117, and thus, a high-pressure space having a relatively high pressure may be formed during operation. A refrigerant having a relatively low pressure may be suctioned into the suction space 119, and thus, a low-pressure space may be formed during operation. Oil may be stored in a bottom region inside of the case 110 (the suction space).

A suction pipe 127 may be provided at one side of the case 110. The suction pipe 127 may be connected to the case 110 in a manner of communicating with the suction space 119. A discharge pipe 125 through which refrigerant may be discharged may be provided at an upper side of the case 110. The discharge pipe 125 may be connected to and communicate with the discharge space 117.

The compression unit 200 may include, for example, an orbiting scroll 210 and a non-orbiting (or fixed) scroll 230 that are engagingly coupled to each other to define a compression chamber S of refrigerant. The orbiting scroll 210 may include, for example, an orbiting end plate 212 and an orbiting wrap 214 that protrudes in a spiral shape from a plate surface of the orbiting end plate 212.

The non-orbiting scroll 230 may include, for example, a non-orbiting end plate 232, a side wall 233 that axially extends from the non-orbiting plate 232, and a non-orbiting wrap 234 provided at a plate surface of the non-orbiting end plate 232 inside of the side wall 233. The compression chamber S may be defined by the orbiting end plate 212, the orbiting wrap 214, the non-orbiting end plate 232, and the non-orbiting wrap 234.

A discharge port 236 may be formed through the non-orbing scroll 230. A discharge valve 260 may be provided at one side of the discharge port 236. Accordingly, the discharge port 236 may be selectively opened and closed.

A back pressure chamber assembly 250 may be provided at one side (an upper side in the drawing) of the non-orbiting scroll 230. The back pressure chamber assembly 250 may include, for example, a back pressure plate 252 provided at the non-orbiting end plate 232 of the non-orbiting scroll 230, and a floating plate 256 coupled to the back pressure plate 252. A back pressure chamber 254 may be provided between the back pressure plate 252 and the floating plate 256.

The back pressure chamber 254 may be in communication with the compression chamber S through a first back pressure hole 238 and a second back pressure hole 258. The first back pressure hole 238 may be formed through the non-orbiting scroll 230. The second back pressure hole 258 may be formed through the back pressure plate 252. Accordingly, the non-orbiting scroll 230 may be pressed in an axial direction (downward direction in the drawing) by pressure of the back pressure chamber 254 to be brought into close contact with the orbiting scroll 210, thereby sealing the compression chamber S provided between the orbiting scroll 210 and the non-orbiting scroll 230. This may result in suppressing refrigerant leakage.

The electric motor 300 that provides a drive power to the compression unit 200 may be provided at a lower side of the compression unit 200. The electric motor 300 may include a stator 310, and a rotor 400 rotatably disposed with respect to the stator 310, for example.

The stator 310 may include, for example, a stator core 320 and a stator coil 340 wound on the stator core 320. The rotor 400 may include, for example, a rotational shaft 410, and a rotor core 430 coupled to the rotational shaft 410.

A main frame 150 may be provided between the electric motor 300 and the compression unit 200. The main frame 150 may be fixedly coupled to an inner surface of the case 110. An Oldham ring 160 may be provided at an upper portion of the main frame 150. This may result in preventing rotation of the orbiting scroll 210. The non-orbiting scroll 230 may be coupled to the main frame 150 to be relatively movable with respect to the main frame 150, for example. In this embodiment, the non-orbiting scroll 230 is configured to move relative to the main frame 150 in the axial direction (up-and-down or vertical direction in the drawing).

The orbiting scroll 210 may be provided with a rotational shaft coupling portion 216 to which the rotational shaft 410 is coupled. Accordingly, a rotational force of the rotational shaft 410 may be transmitted to the orbiting scroll 210. The rotational shaft coupling portion 216 may axially protrude from a bottom portion of the orbiting scroll 210.

The rotational shaft 410 may protrude from both ends of the rotor 400, for example. One or a first end (an upper end in the drawing) of the rotational shaft 410 may penetrate through the main frame 150 to be coupled to the orbiting scroll 210 (rotational shaft coupling portion 216). An eccentric portion 416 may be provided at the upper end of the rotational shaft 410 to be eccentric toward one side. The eccentric portion 416 may be coupled to the rotational shaft coupling portion 216. As the orbiting scroll 210 performs an orbiting motion around the rotational shaft 410 with respect to the non-orbiting scroll 230, a refrigerant may be compressed in the compression chamber S. A main bearing 155 that rotatably supports the rotational shaft 410 may be provided at the main frame 150. The main bearing 155 may be a bush bearing, for example.

Another or a second end (a lower end in the drawing) of the rotational shaft 410 may extend to a lower side of the rotor core 430. A sub frame 170 may be provided at a lower side of the electric motor 300. The sub frame 170 may be fixed to the case 110. The sub frame 170 may be provided with a sub bearing 175 that rotatably supports the rotational shaft 410. The sub bearing 175 may be as a bush bearing, for example.

An oil flow path (or passage) 412 may be formed at the rotational shaft 410 so as to allow oil to flow upwards. An oil transfer member 414 may be provided at the lower end of the rotational shaft 410 so as to transfer oil in an upward direction while rotating. Oil may be injected or introduced into the case 110 until the oil transfer member 414 is submerged. Then, the oil transferred by the oil transfer member 414 may flow to an upper region of the rotational shaft 410 along the oil flow path 412.

Figure 2:
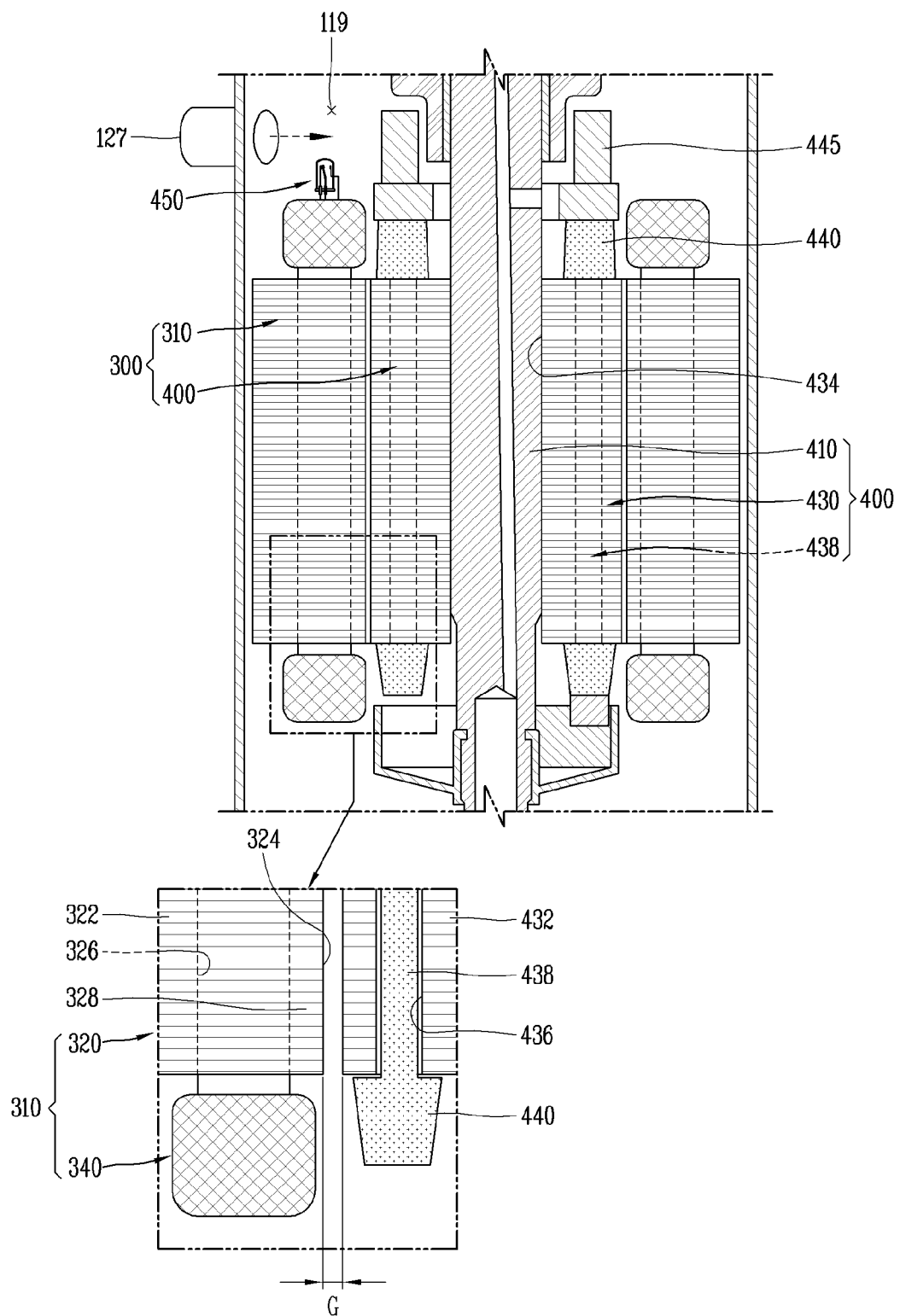
FIG. 2 is an enlarged view of a main portion of the electric motor in FIG. 1.

FIG. 2 is an enlarged view of a main portion of the electric motor in FIG. 1. As illustrated in FIG. 2, the stator 310 may include the stator core 320 and the stator coil 340 wound around the stator core 320. The stator core 320 may be fixedly coupled to the inner surface of the case 110. The stator core 320 may be formed by, for example, stacking a plurality of electrical steel plates 322 in an insulating manner.

The stator core 320 may be provided therein with a rotor accommodation hole 324 with a predetermined air gap G, so as to allow the rotor 400 to be rotatably accommodated therein. The rotor accommodation hole 324 may be axially formed through a central portion of the stator core 320. The rotor core 320 may be provided with a plurality of slots 326 and teeth 328 alternatively disposed along a circumference of the rotor accommodation hole 324. The stator coil 340 may be wound via the slots 326 in a predetermined pattern.

The rotor 400 may include, for example, the rotational shaft 410, the rotor core 430 coupled to the rotational shaft 410, and a plurality of conductor bars 438 coupled to the rotor core 430. The rotor core 430 may be formed by, for example, stacking electrical steel plates 432 in an insulating manner. A rotational shaft hole 434 to which the rotational shaft 410 may be coupled may be provided at the rotor core 430. The rotational shaft hole 434 may be axially formed through a central portion of the rotor core 430. The rotor core 430 may be provided with a plurality of conductor bar insertion portions 436 in which the plurality of conductor bars 438 may be inserted. Each of the plurality of conductor bar insertion portions 436 may penetrate through the rotor core 430 in the axial direction, for example. The plurality of conductor bar insertion portions 436 may be disposed adjacent to an outer circumference of the rotor core 430. The plurality of conductor bar insertion portions 436 may be spaced apart from one another along a circumferential direction of the rotor core 430.

The rotor core 430 may be provided with shorting (or short-circuit) rings 440 that provide electrical connection between the plurality of conductor bars 438. Each of the shorting rings 440 may be formed in a circular ring shape. This may allow ends of the plurality of conductor bars 438 to be electrically connected to one another. The shorting ring 440 may be provided at both ends of the rotor core 430.

The shorting rings 440 may be made of a same material as the plurality of conductor bars 438. More specifically, the plurality of conductor bars 438 and the shorting rings 440 may be formed by, for example, die casting using an aluminum member (alloy). The rotational shaft 430 may be provided with a balance weight 445. The balance weight 445 may be coupled to an outside of the shorting ring 440 along an axial direction of the rotor core 430, for example. The balance weight 445 may be provided, for example, at an upper side of the rotor core 430.

Figure 3:
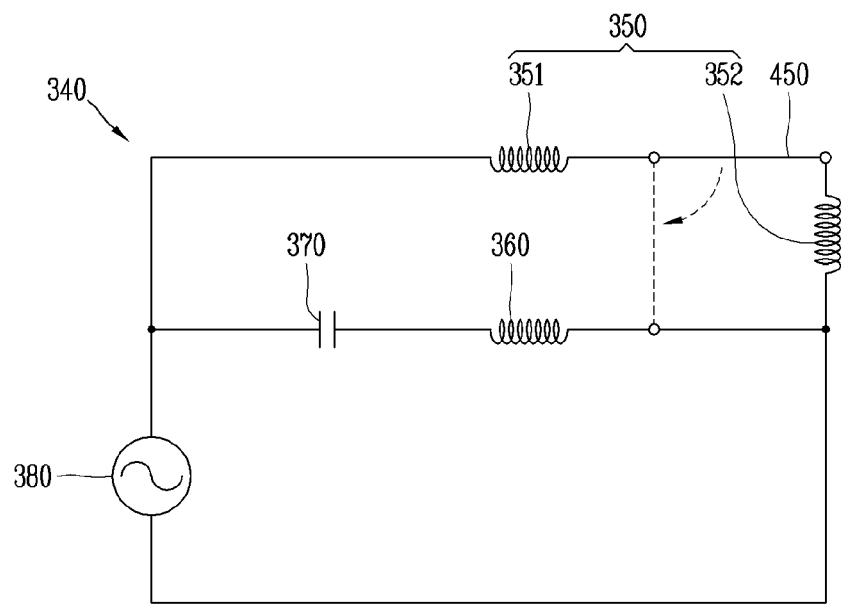
FIG. 3 is a wiring diagram of a stator coil of the electric motor in FIG. 1.

FIG. 3 is a wiring diagram of a stator coil of the electric motor in FIG. 1. As illustrated in FIG. 3, the stator coil 340 may include a main winding 350 and an auxiliary winding 360.

The stator coil 340 may be connected to a power source or power supply unit (hereinafter, "power supply unit" 380) so as to receive power. The main winding 350 and the auxiliary winding 360 may be connected to the power supply unit 380 in parallel.

The stator coil 340 may further include a capacitor 370 connected to the auxiliary winding 360 in series. Accordingly, when power (current) is applied to the stator coil 340, the auxiliary winding 360 is 90° ahead in electrical angle of the main winding 350, namely, the auxiliary winding 360 and the main winding 350 differ in phase (phase difference) by 90°.

The main winding 350 of the stator coil 340 may be divided into a plurality of windings so as to be connected and disconnected to and from each other. Further, the stator coil 340 may include a winding changeover switch (or switching mechanism) 450 that connects and disconnects the plurality of main winding 350. Accordingly, when all of the plurality of main windings 350 are connected in series, a number of turns operated by the main winding 350 may be increased, and when the plurality of main windings 350 is disconnected from each other, only a portion of the main winding 350 is operated, thereby leading to a decrease in the number of actual (operated) turns of the main winding 350.

The winding changeover switch 450 may be configured to connect the plurality of main windings 350 in series until an output of the electric motor 300 reaches a preset or predetermined value, for example, 2500 W. This may result in increasing the number of turns of the main winding turn 350. The winding changeover switch 450 may be configured to disconnect the plurality of main windings 350 from each other when an output of the electric motor 300 reaches a preset or predetermined value, for example, 2500 W, so that only a portion of the main windings 350 is operated. This may allow the number of turns actually operated by the main winding 350 to be reduced.

For reference, a single-phase induction motor has the following characteristics. During an actual load, for example, 1700 W, operating efficiency is increased when the number of turns is increased, and during an overload, for example, 3000 W, operating efficiency is increased when the number of turns is decreased.

The compressor equipped with the electric motor according to this embodiment may be used in an outdoor unit of an air conditioner. In the outdoor unit of the air conditioner, an actual or normal load operation may be performed at an outside temperature of 30° C., and an overload operation may be performed at an outside temperature of 40° C., for example. The actual load may refer to a case when output of the electric motor 300 is 1700 W or less, for example. The overload may refer to a case when the output of the electric motor 300 is 3000 W or more, for example.

The electric motor 300 of this embodiment may be configured to enable both an actual or normal load operation and an overload operation. In this embodiment, a preset or predetermined value (output) of the electric motor 300 may be, for example, 2500 W.

When the output of the motor 300 exceeds the actual or normal load and gets close to overload, the winding changeover switch 450 may be configured such that a mode is switched, for example, at an output of approximately 2500 W of the motor 300. With this configuration, all of the plurality of main windings 350 may be connected (a first mode) by the winding changeover switch 450 until the output of the electric motor 300 reaches the preset value, for example, 2500 W. By doing so, during a first load (for example less than 2500 W) operation, which is a relatively small load, the number of actual turns of the main winding 350 may be increased, thereby improving operating efficiency.

In addition, the plurality of main windings 350 may be disconnected from each other (a second mode) during a second load (for example, greater than or equal to 2500 W) operation, which is greater than the first load, thereby suppressing a decrease in operating efficiency due to an increase in the number of turns of the main winding 350 at the second load (overload) operation. This may lead to an increase in operating efficiency during the second load operation.

More specifically, the main winding 350 may be configured as, for example, a first main winding 351 and a second main winding 352. The first main winding 351 and the second main winding 352 may have a different number of turns.

The first main winding 351 and the second main winding 352 may be connected and disconnected by the winding changeover switch 450. The winding changeover switch 450 may be configured to switch modes between the first mode in which the first main winding 351 and the second main winding 352 are connected in series and the second mode in which the first main winding 351 and the second main winding 352 are disconnected from each other.

The winding changeover switch 450 may allow the main winding 350 to be operated in the first mode or the second mode. The winding changeover switch 450 may be connected to one end of the first main winding 351 and one end of the second main winding 352, which are respectively wound on the stator core 320, and disposed inside of the case 110.

In the electric motor 300 of this embodiment, as the winding changeover switch 450 is disposed inside of the case 110, a circuit and a switch that switches the main winding 350 are not separately or additionally provided at an outside of the case 110, enabling a simple configuration and ease of manufacturing.

Figure 4:
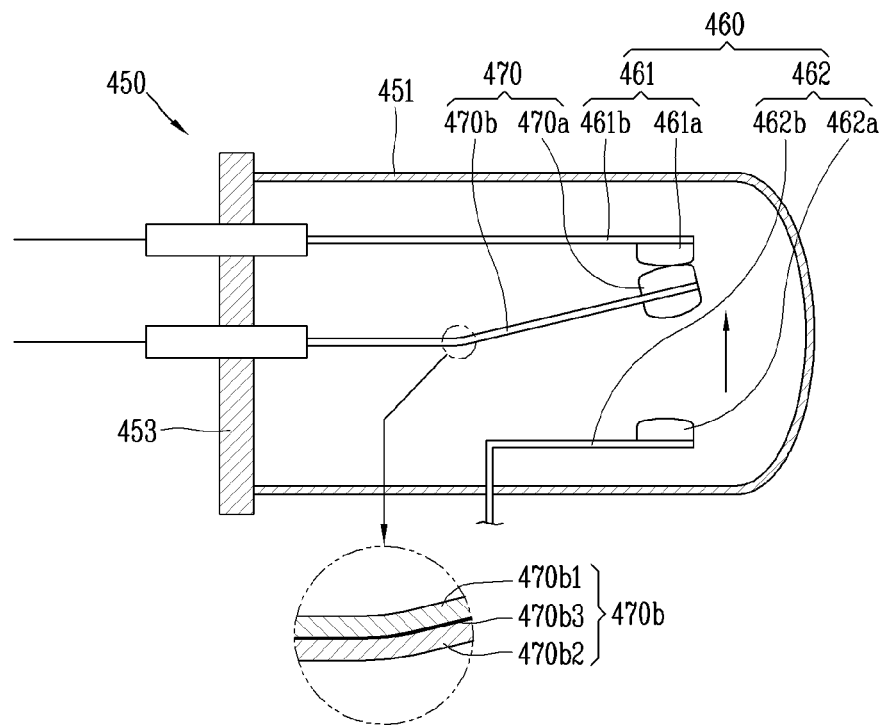
FIG. 4 is an enlarged view of a winding changeover switch of FIG. 1.
Figure 5:
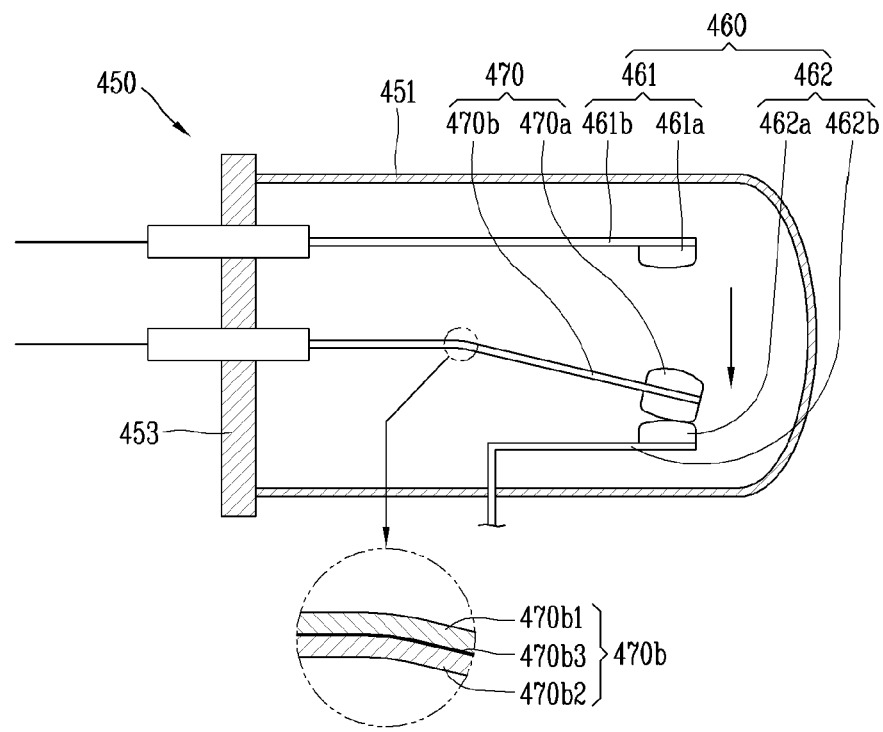
FIG. 5 is a diagram illustrating operation of a movable terminal of the winding changeover switch in FIG. 4.
Figure 6:
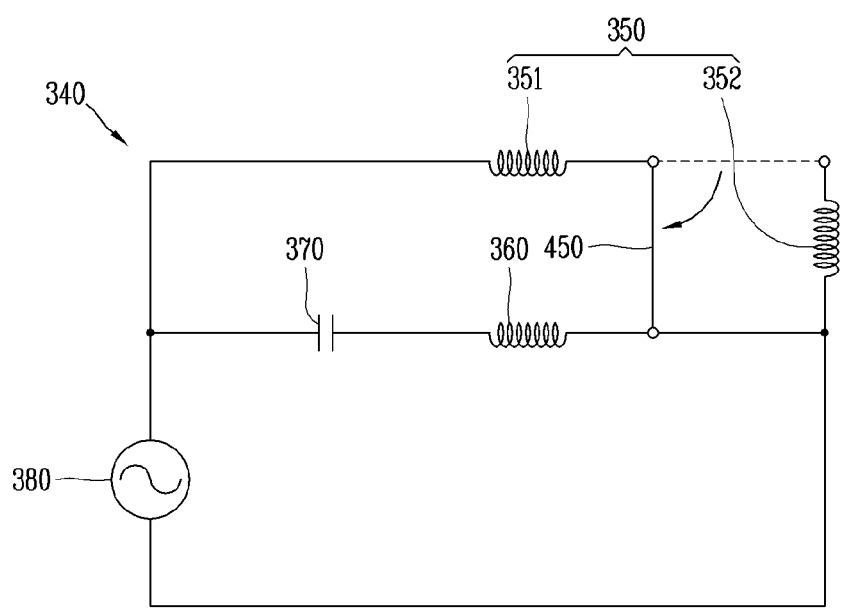
FIG. 6 is a diagram illustrating operation of the winding changeover switch of FIG. 3.

FIG. 4 is an enlarged view of a winding changeover switch of FIG. 1. FIG. 5 is a diagram for explaining operation of the winding changeover switch of FIG. 4. FIG. 6 is a diagram for explaining operation of the winding changeover switch in FIG. 3.

As illustrated in FIG. 4, the winding changeover switch 450 may include a tube 451 defining an accommodation space therein, a fixed terminal 460 disposed inside of the tube 451, and a movable terminal 470 configured to be brought into contact with and separated from the fixed terminal 460.

The tube 451 may be, for example, formed in a cylindrical shape having one open end. An inside of the tube 451 may be embodied as a vacuum, for example. A sealing portion or seal 453 that hermetically seals the tube 451 may be provided at the one end of the tube 451.

The fixed terminal 460 may include a first fixed terminal 461 disposed at one inner side of the tube 451, and a second fixed terminal 462 disposed to be spaced apart from the first fixed terminal 461.

The winding changeover switch 450 of the electric motor 300 according to this embodiment may be implemented as a so-called "three-point switch" including the first fixed terminal 461, the second fixed terminal 462, and the movable terminal 470.

The first fixed terminal 461 may include a first fixed contact 461a, and a first conductor 461b electrically connected to the first fixed contact 461a. The first conductor 461b may extend along a lengthwise direction of the tube 451 by passing through the sealing portion 453. The first fixed contact 461a may be provided at an end of the first conductor 461b disposed inside of the tube 451. The first fixed contact 461a may be spaced apart from an inner surface of the tube 451 by a predetermined distance. The first fixed contact 461a may be disposed at an end of the first conductor 461b to protrude toward a central side (inward) of the tube 451.

The second fixed terminal 462 may include a second fixed contact 462a, and a second conductor 462b electrically connected to the second fixed contact 462a. The second conductor 462b may extend to a certain length (section) along a lengthwise direction of the tube 451, and may extend outward by passing through a side (or lateral) surface of the tube 451. The second fixed contact 462a may be provided at an end of the second conductor 462b disposed inside of the tube 451. The second fixed contact 462a may be spaced apart from the inner surface of the tube 451 by a predetermined distance. The second fixed contact 462a may be disposed at the end of the second conductor 462b in a manner of protruding toward a central side (inward) of the tube 451.

The movable terminal 470 may include a movable contact 470a, and a bimetal member 470b electrically connected to the movable contact 470a and configured to be elastically deformable during electrical connection. The movable contact 470a may protrude to both sides of the bimetal member 470b for example.

As is well known, the bimetal member 470b may be formed by joining two members with different coefficients of thermal expansion together, namely a first metal member 470b1 having a long plate shape and a second metal member 470b2. A bonding layer 470b3 may be formed between the first metal member 470b1 and the second metal member 470b2. The first metal member 470b1 and the second metal member 470b2 of the bimetal member 470b may have a thin thickness so as to be bendable when a temperature increases due to electrical connection. The bimetal member 470b may pass through the sealing portion 453 to extend along the lengthwise direction of the tube 451. The bimetal member 470b may be spaced apart from the first conductor 461b by a predetermined distance.

The bimetal member 470b may be bent toward the first metal member 470b1 when power supply is stopped, and bent toward the second metal member 470b2 when a temperature increases as power is supplied, for example. When the power supply is stopped, the bimetal member 470b may be configured such that the movable contact 470a is brought into contact with the first fixed contact 461a, as illustrated in FIG. 4. The bimetal member 470b may be configured such the movable contact 470a is separated from the first fixed contact 461a to be in contact with the second fixed contact 462a, as illustrated in FIG. 5, when a sufficient current is supplied to cause the output of the electric motor 300 to reach the preset value, for example, 2500 W.

With this configuration, when operation is started and power is applied to the stator coil 340, the rotor 400 may be rotated centered on the rotational shaft 410 by interacting with the stator 310. When the output of the electric motor 300 reaches the preset value, for example, 2500 W, the movable terminal 470 of the winding changeover switch 450 may be elastically deformed toward the second fixed contact 462a due to thermal expansion of the bimetal member 470b so as to be in contact with the second fixed terminal 462.

Accordingly, as illustrated in FIG. 6, the stator coil 340 may have an electric circuit configuration that includes the first main winding 351, the capacitor 370, and the auxiliary winding 360 as the second main winding 352 is separated from the first main winding 351. This configuration allows the number of turns actually operated by the main winding 350 to be reduced during the second load (second mode) operation, thereby improving operating efficiency at the second load.

Figures 7, 8:
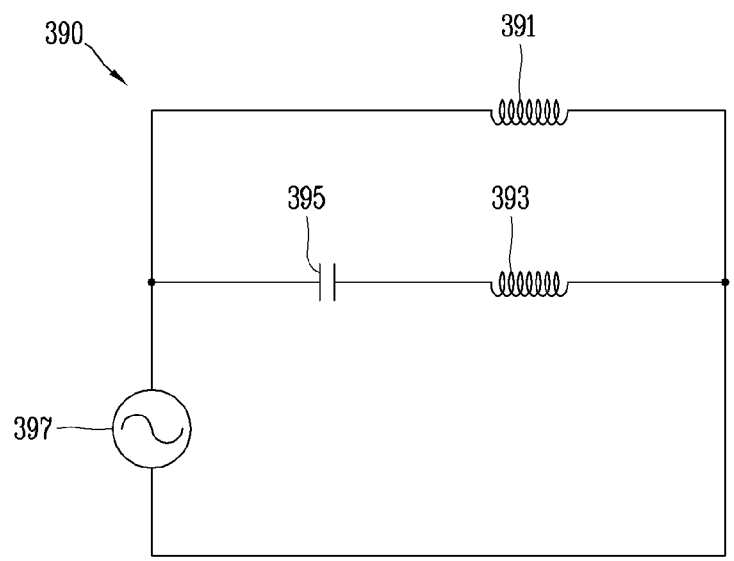
FIG. 7 is a wiring diagram of an exemplary stator coil for comparing with the stator coil of the electric motor in FIG. 1.
FIG. 8 illustrates a configuration of the stator coil in FIG. 7.

FIG. 7 is a wiring diagram of an exemplary stator coil for comparing with the stator coil of the electric motor in FIG. 1. FIG. 8 illustrates a configuration of the stator coil of the comparative example of FIG. 7. As is well known, the electric motor 300 may be configured to have a capacity (rated capacity) corresponding to a magnitude of power required for a machine to which it is connected.

In order to more clearly describe the configuration and characteristics of the electric motor 300 according to embodiments, a configuration of an electric motor 390 of a comparative example will be described with reference to FIGS. 7 and 8. As illustrated in FIG. 7, the electric motor 390 of the comparative example may be implemented as a single-phase induction motor including a main winding 391 and an auxiliary winding 393 that are connected to a power supply 397 in parallel, and a capacitor 395 connected to the auxiliary winding 393 in series. As illustrated in FIG. 8, the electric motor 390 of the comparative example may be configured such that the main winding 391 has a wire diameter of 1 mm and 162 turns, and the auxiliary winding 393 has a wire diameter of 1.15 mm and 80 turns, for example.

FIG. 9 illustrates a configuration of the stator coil of the electric motor of FIG. 1. As illustrated in FIG. 9, without changing the slots 326 and the teeth 328 of the stator core 320, the main winding 350 and the auxiliary winding 360 of the stator coil 340 of the electric motor 300 according to embodiments exhibits increased turns than the main winding 391 and the auxiliary winding 393 of the stator coil 390 of the electric motor according to the comparative example.

As a total number of turns of the main winding 350 and the auxiliary winding 360 of the stator coil 340 are greater than those of the main winding 391 and the auxiliary winding 393 of the stator coil 390 of the electric motor of the comparative example, operating efficiency may be improved during the first load (including the actual load) operation. More specifically, the stator coil 340 may be configured such that a wire diameter of the main winding 350 is 0.95 mm, which is 0.05 mm less (or smaller) than a wire diameter of the main winding 391 of 1.0 mm in the stator coil 390 of the comparative example.

Also, the stator coil 340 may be configured such that the main winding 350 has a total of 176 turns, which is 14 turns more than 162 turns of the main winding 391 of the stator coil 390 of the comparative example. Further, the stator coil 340 may be configured such that a wire diameter of the auxiliary winding 360 is 1.10 mm, which is 0.05 mm less than a wire diameter of the auxiliary winding 393 of 1.15 mm of the stator coil 390 of the comparative example. Furthermore, the stator coil 340 may be configured such that the auxiliary winding 360 has 86 turns, which is 6 turns more than 80 turns of the auxiliary winding 393 of the stator coil 390 of the comparative example.

The first main winding 351 of the stator coil 340 of the electric motor 300 according to embodiments may be configured to have 75 to 95% of the number of turns in the main winding 350. Moreover, the first main winding 351 of the stator coil 340 of the electric motor 300 according to embodiments may be configured to have 85 to 90% of the number of turns in the main winding 350.

The first main winding 351 may have 132 to 167 turns, and the second main winding 352 may have 9 to 44 turns, for example. Moreover, the first main winding 351 may have 150 to 159 turns, and the second main winding 352 may have 17 to 26 turns.

In a case in which efficiency of the electric motor 300 is considered as a highest priority, the winding changeover switch 450 may be configured to switch the mode when the output (set or predetermined value) of the electric motor 300 is 2000 to 3000 W. The winding changeover switch 450 may be configured to switch the mode when the output (set or predetermined value) of the electric motor 300 is 2400 to 2600 W in terms of efficiency of the electric motor 300.

The first main winding 351 may have a number of turns corresponding to 85 to 90% of a number of turns of the main winding 350, and the winding changeover switch 450 may be configured to switch the mode when the output (set or predetermined value) of the electric motor 300 is 2400 to 2600 W.

Moreover, the first main winding 351 may have a number of turns corresponding to 90% of a number of turns of the main winding 350, and the winding changeover switch 450 may be configured to switch the mode when the output (set or predetermined value) of the motor 300 is 2700 to 2800 W.

Hereinafter, embodiments will be described with reference to FIGS. 10 to 22.

FIG. 10 illustrates a specific configuration of a main winding of the stator coil of the electric motor in FIG. 1. As illustrated in FIG. 10, the main winding 350 of the stator coil 340 of the electric motor 300 according to an embodiment may include the first main winding 351 and the second main winding 352.

The first main winding 351 may have a conductor (wire) diameter of 0.95 mm, and a number of turns (N1) of 159. The second main winding 352 may have a conductor (wire) diameter of 0.95 mm, and a number turns (N2) of 17.

The main winding 350 may have a total of 176 turns. The first main winding 351 may have, for example, the number of turns (N1) corresponding to 90% of the number of turns (total number of turns) in the main winding 350. A ratio of the first main winding 351 to the total number of turns of the main winding 350 may be 0.903.

The winding changeover switch 450 of the electric motor 300 according to an embodiment may be configured such that the main winding 350 is switched to the second mode from the first mode when the output of the electric motor 300 is 2400 to 2800 W.

The winding changeover switch 450 of this embodiment may be configured such that the second main winding 352 is disconnected from the first main winding 351 when the output of the electric motor 300 is 2400 to 2800 W.

Figures 11, 12:
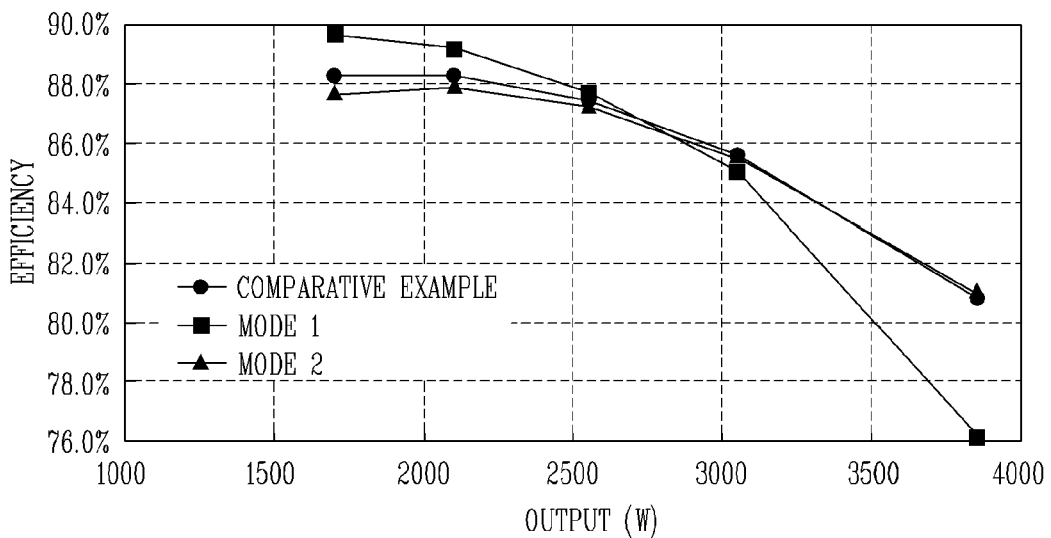
FIG. 11 is a graph showing an output and efficiency of the electric motor of FIG. 10.
FIG. 12 illustrates another embodiment of a main winding of the stator coil in FIG. 1.

FIG. 11 illustrates an output and efficiency of the electric motor of FIG. 10. As illustrated in FIG. 11, in the stator coil 340 of the electric motor 300 according to this embodiment, the main winding 350 has 176 turns in the first mode operation, thereby improving operating efficiency during the first load (actual load included) operation.

Further, as the first main winding 351 is only operated during the second mode operation, the number of actual turns in the main winding 350 is 159 turns, namely, the number of turns (N1) of the first main winding 351, which is less than 162 turns of the main winding 391 of the stator coil 390 of the electric motor of the comparative example, operating efficiency may be improved during the second load (overload included) operation.

Referring still to FIG. 11, the motor 300 according to this embodiment exhibits improved operating efficiency than the electric motor of the comparative example during the first mode operation (less than 2750 W, actual load included). The electric motor 300 according to this embodiment may maintain operating efficiency substantially equal to the electric motor of the comparative example during the second mode operation (greater than or equal to 2750 W, overload included).

More specifically, in the winding changeover switch 450 of this embodiment may be configured such that the second main winding 352 is disconnected from the main winding 351 when the output of the motor 300 is around 2750 W, for example, 2700 to 2800 W. In terms of overall consideration of operating efficiency of the electric motor 300, the number of switching times of the winding changeover switch 450, and reliability, the winding changeover switch 450 may be configured such that the first mode is switched to the second mode when the output of the electric motor 300 is 2500 W.

Figures 13, 14:
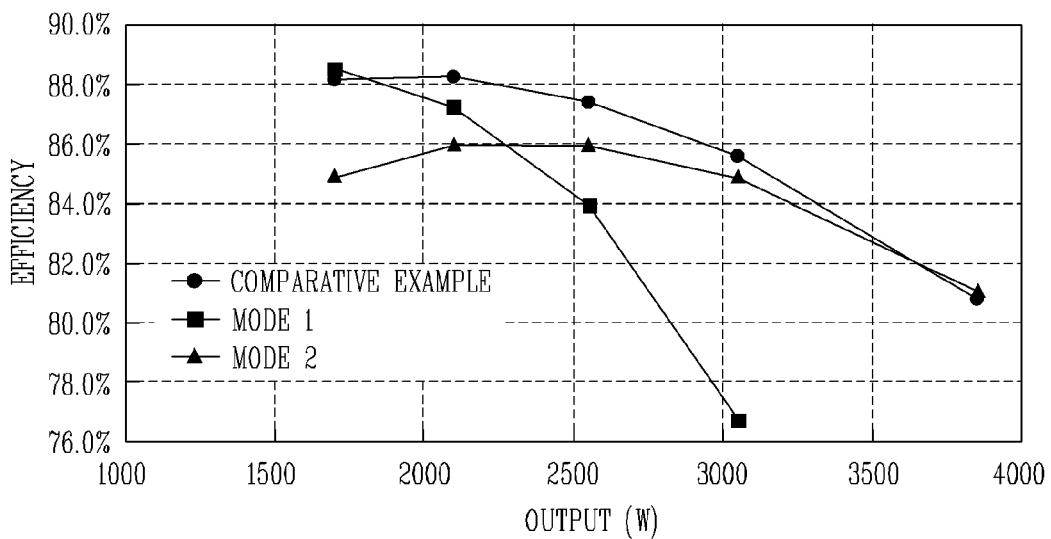
FIG. 13 is a graph showing output and efficiency of an electric motor of FIG. 12.
FIG. 14 illustrates yet another embodiment of a main winding of the stator coil of FIG. 1.

FIG. 12 illustrates another embodiment of a main winding of the stator coil in FIG. 1. FIG. 13 illustrates an output and efficiency of an electric motor of FIG. 12. The stator coil 340 of the electric motor 300 according to this embodiment may include main winding 350, auxiliary winding 360, capacitor 370, and winding changeover switch 450. The main winding 350 may include first main winding 351 and second main winding 352. The first main winding 351 and the second main winding 352 may be connected to each other with the winding changeover switch 450 interposed therebetween.

As illustrated in FIG. 12, the first main winding 351 may have a conductor (wire) diameter of 0.95 mm and the number of turns (N1$a$) of 124, for example. The second main winding 352 may have a conductor (wire) diameter of 0.95 mm and the number of turns (N2$a$) of 52. The main winding 350 of this embodiment may have 176 turns (total number of turns) the same as the previous embodiment.

A ratio of turns of the first main winding 351 to the total number of turns of the main winding 350 may be 0.704. The first main winding 351 may have the number of turns (N1$a$) corresponding to 70% of the total number of turns of the main winding 350.

Referring to FIG. 13, at an actual load, for example, 1700 W or less, the electric motor 300 of this embodiment operated in the first mode exhibits better operating efficiency than the electric motor of the comparative example. After exceeding the actual load, operating efficiency of the electric motor 300 may be lower than the electric motor of the comparative example, during both the first mode operation and the second mode operation. It can be seen that the second mode operation exhibits better operating efficiency than the first mode operation when the output of the electric motor 300 is approximately 2300 W.

In this embodiment, the winding changeover switch 450 may be configured to switch a mode from the first mode to the second mode at the 1700 W when operating efficiency during the actual load operation is considered as the highest priority. The winding changeover switch 450 may be configured such that the first mode is switched to the second mode when the output of the electric motor 300 is 2500 W in terms of overall consideration of operating efficiency of the electric motor 300, the number of switching times of the winding changeover switch 450, and reliability.

Figures 15, 16:
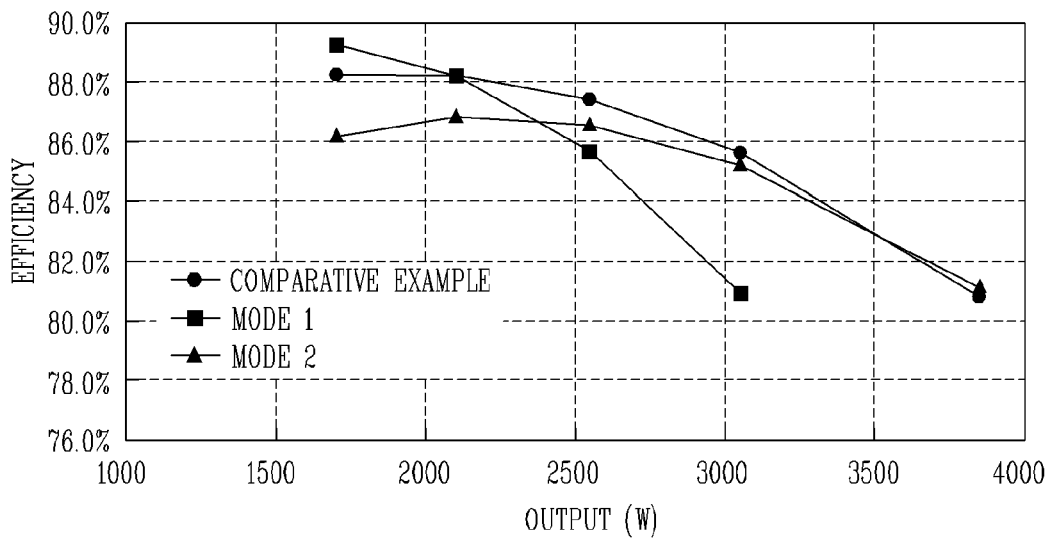
FIG. 15 is a graph showing an output and efficiency of an electric motor of FIG. 14.
FIG. 16 illustrates yet another embodiment of a main winding of the stator coil in FIG. 1.

FIG. 14 illustrates another embodiment of a main winding of the stator coil of FIG. 1. FIG. 15 illustrates an output and efficiency of an electric motor of FIG. 14. As described above, the stator coil 340 of the electric motor 300 according to this embodiment may include main winding 350, auxiliary winding 360, capacitor 370, and winding changeover switch 450. The main winding 350 may include first main winding 351 and second main winding 352. The first main winding 351 and the second main winding 352 may be connected to each other with the winding changeover switch 450 interposed therebetween.

The main winding 350 may have a conductor diameter of 0.95 mm and a total of 176 turns. As illustrated in FIG. 14, the first main winding 351 may have a conductor (wire) diameter of 0.95 mm, and a number of turns (N1$b$) of 132, for example. The second main winding 352 may have a conductor (wire) diameter of 0.95 mm and a number of turns (N2$b$) of 44.

The first main winding 351 may be configured to have the number of turns (N1$b$) corresponding to 75% of the total number of turns of the main winding 350. A ratio of turns of the first main winding 351 to the total number of turns of the main winding 350 may be 0.75.

Referring to FIG. 15, at an output of 2000 W or less, the electric motor 300 according to this embodiment operated in the first mode exhibits better efficiency than the electric motor of the comparative example. It can be seen that the second mode operation exhibits better operating efficiency than the first mode operation when the output of the electric motor 300 is around 2400 W.

In this embodiment, the winding changeover switch 450 may be configured to switch a mode from the first mode to the second mode at the 2400 W when operating efficiency is considered as a highest priority. The winding changeover switch 450 may be configured such that the first mode is switched to the second mode when the output of the electric motor 300 is 2500 W in terms of overall consideration of operating efficiency of the electric motor 300, the number of switching times of the winding changeover switch 450, and reliability.

Figures 17, 18:
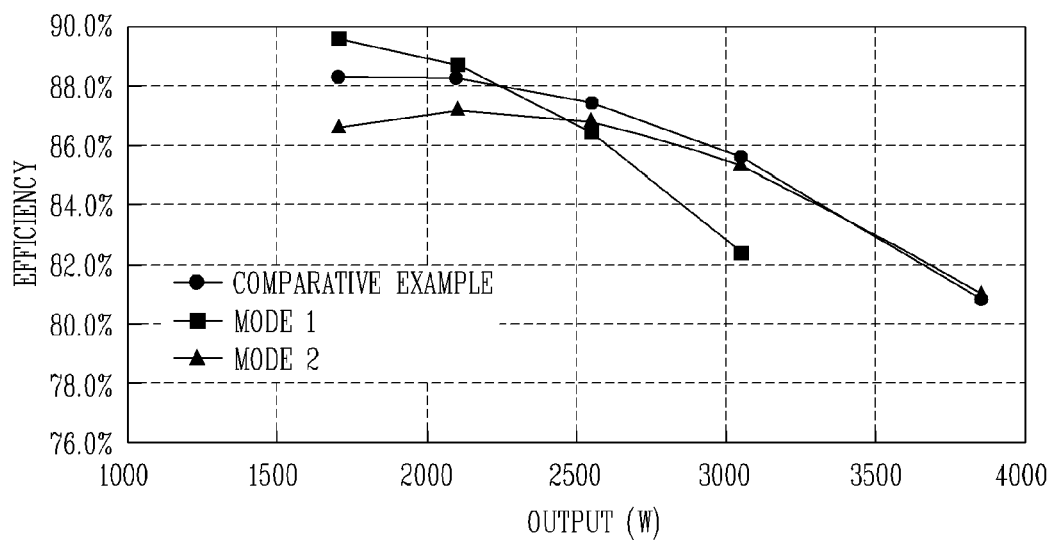
FIG. 17 is a graph showing an output and efficiency of an electric motor of FIG. 16.
FIG. 18 illustrates yet another embodiment of a main winding of the stator coil in FIG. 1.

FIG. 16 illustrates another embodiment of a main winding of the stator coil in FIG. 1. FIG. 17 illustrates an output and efficiency of an electric motor of FIG. 16. As described above, the stator coil 340 of the electric motor 300 according to this embodiment may include main winding 350, auxiliary winding 360, capacitor 370, and winding changeover switch 450. The main winding 350 may include first main winding 351 and second main winding 352. The first main winding 351 and the second main winding 352 may be connected to each other with the winding switching switch 450 interposed therebetween.

The main winding 350 may have a conductor diameter of 0.95 mm and a total of 176 turns. As illustrated in FIG. 16, the first main winding 351 may have a conductor (wire) diameter of 0.95 mm, and a number of turns (N1$c$) of 141, for example. The second main winding 352 may have a conductor (wire) diameter of 0.95 mm and a number of turns (N2$c$) of 35.

The first main winding 351 may be configured to have the number of turns (N1$c$) corresponding to 80% of the total number of turns of the main winding 350. A ratio of turns of the first main winding 351 to the total number of turns of the main winding 350 may be 0.801.

Referring to FIG. 17, at an output of 2200 W or less, the electric motor 300 according to this embodiment operated in the first mode exhibits better efficiency than the electric motor of the comparative example. It can be seen that the second mode operation exhibits better operating efficiency than the first mode operation when the output of the electric motor 300 is 2400 W to 2500 W.

In this embodiment, the winding changeover switch 450 may be configured to switch a mode from the first mode to the second mode when the output of the electric motor 300 is 2400 W to 2500 W in association with operating efficiency. The winding changeover switch 450 may be configured such that the first mode is switched to the second mode when the output of the electric motor 300 is 2500 W in terms of overall consideration of operating efficiency of the electric motor 300, the number of switching times of the winding changeover switch 450, and reliability.

Figures 19, 20:
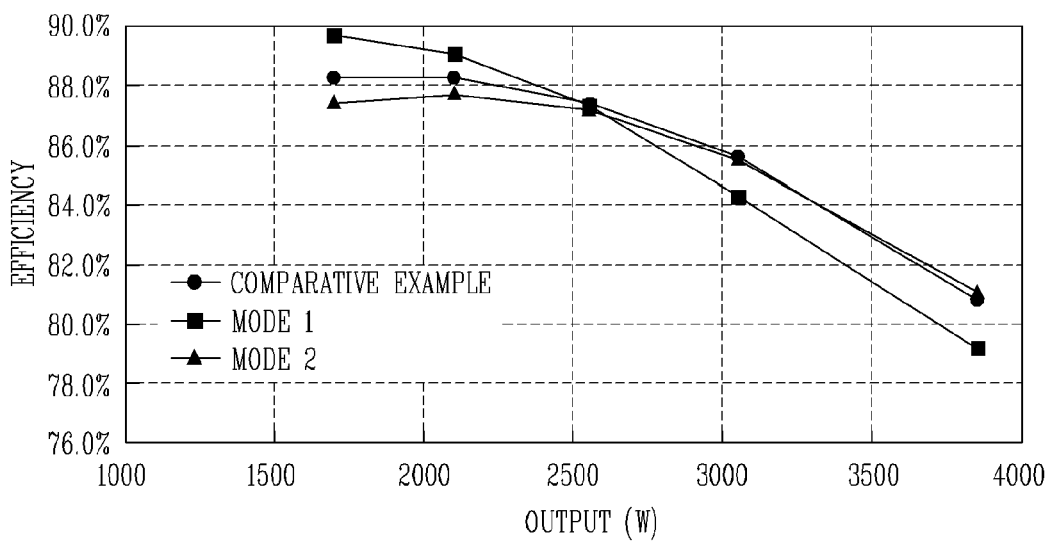
FIG. 19 is a graph showing output and efficiency of an electric motor of FIG. 18.
FIG. 20 illustrates yet another embodiment of a main winding of the stator coil in FIG. 1.

FIG. 18 illustrates another embodiment of a main winding of the stator coil in FIG. 1. FIG. 19 illustrates an output and efficiency of an electric motor of FIG. 18. As described above, the stator coil 340 of the electric motor 300 according to this embodiment may include main winding 350, auxiliary winding 360, capacitor 370, and winding switching switch 450. The main winding 350 may include first main winding 351 and second main winding 352. The first main winding 351 and the second main winding 352 may be connected to each other with the winding changeover switch 450 interposed therebetween.

The main winding 350 may have a conductor diameter of 0.95 mm and a total of 176 turns. As illustrated in FIG. 18, the first main winding 351 may have a conductor (wire) diameter of 0.95 mm and a number of turns (N1$d$) of 150. The second main winding 352 may have a conductor (wire) diameter of 0.95 mm and a number of turns (N2$d$) of 26.

The first main winding 351 may be configured to have the number of turns (N1$d$) corresponding to 85% of the total number of turns of the main winding 350. A ratio of turns of the first main winding 351 to the total number of turns of the main winding 350 may be 0.852.

Referring to FIG. 19, at an output of approximately 2600 W, for example, 2550 to 2650 W, the electric motor 300 according to this embodiment operated in the first mode exhibits better efficiency than the electric motor of the comparative example. It can be seen that the second mode operation exhibits better operating efficiency than the first mode operation when the output of the electric motor 300 is around 2600 W, for example, 2550 to 2650 W.

In this embodiment, the winding changeover switch 450 may be configured to switch a mode from the first mode to the second mode when the output of the electric motor 300 is approximately 2600 W, for example, 2550 to 2650 W, in associations with operating efficiency.

The winding changeover switch 450 may be configured such that the first mode is switched to the second mode when the output of the electric motor 300 is 2500 W in terms of overall consideration of operating efficiency of the electric motor 300, the number of switching times of the winding changeover switch 450, and reliability.

Figure 21:
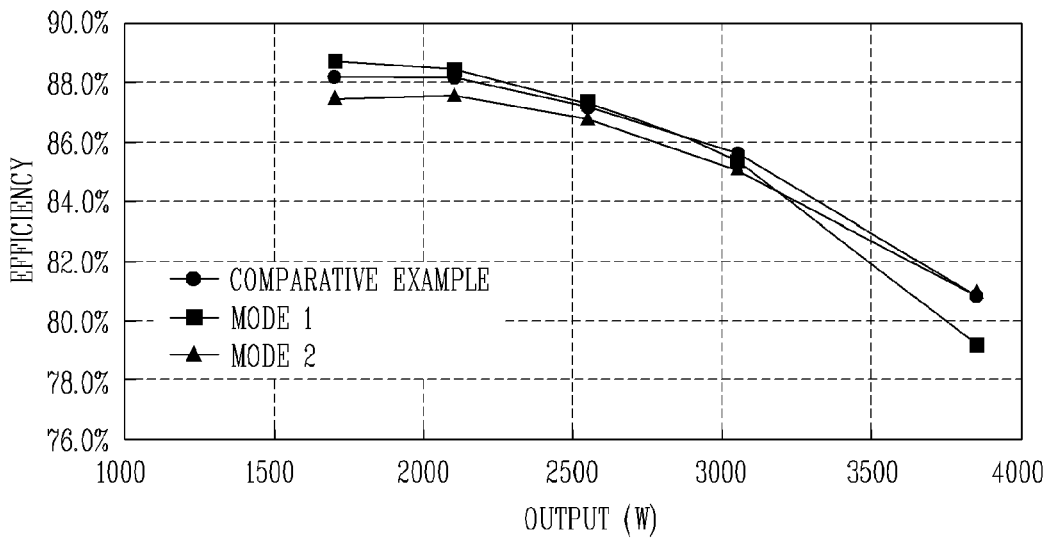
FIG. 21 is a graph showing output and efficiency of an electric motor of FIG. 20.

FIG. 20 illustrates another embodiment of a main winding of the stator coil in FIG. 1. FIG. 21 illustrates an output and efficiency of an electric motor of FIG. 20. As described above, the stator coil 340 of the electric motor 300 of this embodiment includes main winding 350, auxiliary winding 360, capacitor 370, and winding changeover switch 450.

The main winding 350 may include first main winding 351 and second main winding 352. The first main winding 351 and the second main winding 352 may be connected to each other with the winding changeover switch 450 interposed therebetween.

The main winding 350 may have a conductor (wire) diameter of 0.95 mm and a total of 176 turns. As illustrated in FIG. 20, the first main winding 351 may have a conductor (wire) diameter of 0.95 mm and a number of turns (N1$e$) of 167, for example. The second main winding 352 may have a conductor (wire) diameter of 0.95 mm and a number of turns (N2$e$) of 9.

The first main winding 351 may have the number of turns (N1$e$) corresponding to 95% of the total number of turns of the main winding 350. A ratio of turns of the first main winding 351 to the total number of turns of the main winding 350 may be 0.9488.

Referring to FIG. 21, at an output of 2200 W or less, the electric motor 300 according to this embodiment exhibits better efficiency than the electric motor of the comparative example. Moreover, operating efficiency may be slightly increased compared to the electric motor of the comparative example during the first mode operation at an output of 1700 W. In the electric motor 300 of this embodiment, operating efficiency gradually decreases after a section of the 1700 W, and maintains the same level in a section of 2100 W to 2500 W.

It can be seen that the second mode operation exhibits better operating efficiency than the first mode operation when the output of the electric motor 300 is around 3100 W. In this embodiment, the winding changeover switch 450 may be configured to switch a mode from the first mode to the second mode at the 3100 W when operating efficiency is considered as the highest priority. The winding changeover switch 450 may be configured such that the first mode is switched to the second mode when the output of the electric motor 300 is 2500 W when considering various factors such as overall consideration of operating efficiency of the electric motor 300, the number of switching times of the winding changeover switch 450, and reliability.

Figure 22:
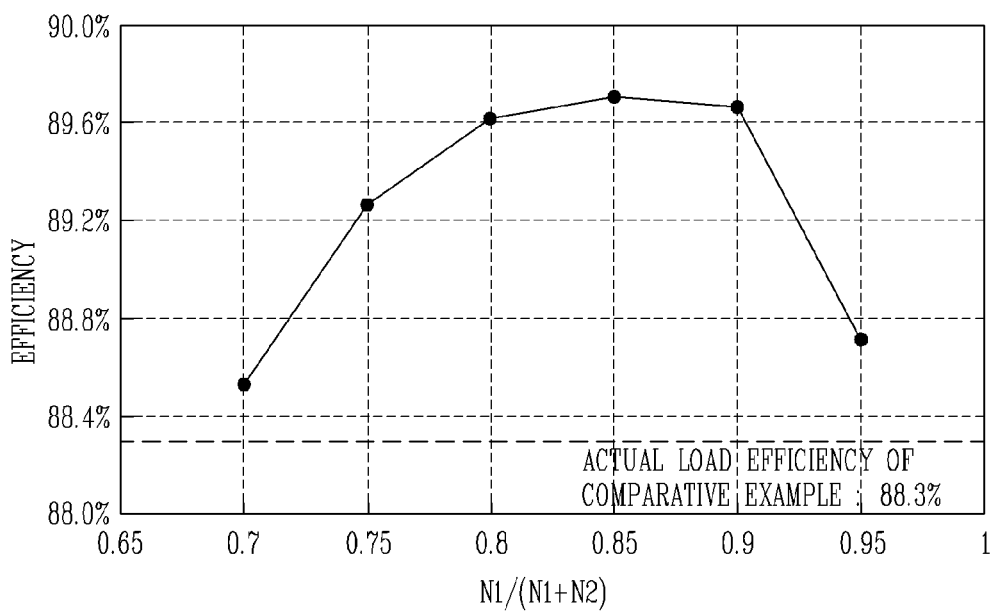
FIG. 22 is a graph showing changes in number of turns of the main winding of the stator coil of FIG. 1 and changes in operating efficiency.

FIG. 22 illustrates changes in the number of turns of the stator coil of FIG. 1, and changes in operating efficiency. As illustrated in FIG. 22, when the ratio of the turns (N1) of the first main winding 351 to the total number of turns of the main winding 350 is 0.7 to 0.95, the electric motor 300 of this embodiment exhibits better operating efficiency at the actual load (1700 W) than the eclectic motor of the comparative example. Further, when the ratio of the turns (N1) of the first main winding 351 to the total number of turns of the main winding 350 is 0.8 to 0.9, operating efficiency of the electric motor 300 according to this embodiment is significantly increased, compared to the electric motor of the comparative example.

Embodiments disclosed herein provide an electric motor capable of increasing operating efficiency at an actual load, and a compressor having an electric motor. Embodiments disclosed herein further provide an electric motor capable of requiring no additional capacitor, and a compressor having an electric motor. Embodiments disclosed herein furthermore provide an electric motor capable of suppressing or reducing a decrease in efficiency at an overload, and a compressor having an electric motor.

Embodiments disclosed herein provide an electric motor capable of having a reduced number of coil windings during overload operation than during actual load operation, and a compressor having an electric motor. Embodiments disclosed herein also provide describes an electric motor capable of allowing a main winding to be switched in a sealed space of a compressor case, and a compressor having an electric motor. Embodiments disclosed herein provide an electric motor that may include a stator coil having a plurality of main windings so as to be connected to each other or separated from each other.

More specifically, the main winding of the stator coil may be divided into a plurality of the main windings configured to be connected to each other and disconnected from each other by a winding changeover switch. Accordingly, the divided main windings may be connected to each other at a relatively low load (including an actual load), and disconnected from each other at a high load (including an overload) higher than the low load.

As a result, operating efficiency at the low load (actual load included) may be increased as the number of turns of the main winding is increased, and operating efficiency at the high load (overload included) may also be improved as the number of turns of the main winding is reduced.

The electric motor may include a stator and a rotor. The stator may include a stator core, and the stator coil wound on the stator core. The rotor may be provided with a rotational shaft and may be rotatably disposed with respect to the stator.

According to embodiments, the electric motor may include a stator having a stator core and a stator coil, and a rotor provided with a rotational shaft and rotatably disposed with respect to the stator. The stator coil may include a main winding and an auxiliary winding connected to each other with a phase difference (current phase difference). The main winding may be divided into a plurality of main windings so as to be connected to each other and disconnected from each other. The stator coil may further include a winding changeover switch configured to provide connection and disconnection between the plurality of main windings.

The winding changeover switch may include a fixed terminal, and a movable terminal having a bimetal member. The winding changeover switch may be configured such that the plurality of main windings is connected in series when the rotor is stationary and the plurality of main windings is disconnected from each other so that only one of the first main winding or the second main winding is operated when an output of the electric motor reaches a preset or predetermined value (set value).

The main winding may be configured as a first main winding and a second main winding. One end of the first main winding may be connected to the fixed terminal, and one end of the second main winding may be connected to the movable terminal. The fixed terminal may include a first fixed terminal to which the first main winding is connected, and a second fixed terminal to which a neutral wire is connected.

The winding changeover switch may be configured to switch modes between a first mode in which the first main winding and the second main winding are connected in series as the movable terminal is in contact with the first fixed terminal, and a second mode in which the first main winding and the second main winding connected in series is disconnected from each other.

The first main winding and the second main winding may be made of conductors, each having a diameter smaller than a diameter of a conductor of a single main winding. A sum of turns of the first main winding turns and turns of the second main winding may be greater than a number of turns of a single main winding.

The winding switching switch may be configured to switch a mode to the first mode at a first load (including an actual load), which is a relatively low load, and thus, the number of turns actually operated by the main winding may be increased. This may result in increasing operating efficiency.

In addition, at a second load (including an overload), which is greater than the first load, the mode may be switched to the second mode by the winding changeover switch, and thus, the number of turns actually operated by the main winding may be reduced, allowing operating efficiency at the second load (overload) to be increased or improved.

The first main winding may be configured to have the number of turns corresponding to 75 to 95% of the number of turns (total number of turns) of the main winding. The number of turns of the main winding (total number of turns) may be equal to the sum of the first main winding turns and the second main winding turns (the number of turns). The first main winding may be configured to have the number of turns corresponding to 85 to 90% of the number of turns of the main winding.

The winding changeover switch may be configured to switch the mode when the output (set value) of the electric motor is 1700 to 3100 W. The winding changeover switch may be configured to switch the mode to the first mode in which the first main winding and the second main winding are connected in series when the output (set value) of the electric motor is less than 2000 W. The winding changeover switch may be configured to switch the mode to the second mode in which the first main winding and the second main winding are disconnected from each other so as to allow the first main winding to be only operated when the output (set value) of the electric motor is 2000 to 3000 W.

The winding changeover switch may be configured to switch the mode to the second mode when the output (set value) of the electric motor is 2400 to 2600 W. The winding changeover switch may be configured such that the mode is switched to the first mode in which the first main winding and the second main winding are connected in series when the output (set value) of the electric motor is less than 2400 W. The winding changeover switch may be configured that the mode is switched to the second mode in which the first winding and the second main winding are disconnected from each other when the output (set value) of the electric motor is 2400 to 2600 W.

In a reference example or comparative example (hereinafter, "comparative example") in which one main winding and one auxiliary winding are provided, the main winding may have a conductor (coil) diameter of 1.0 mm and 162 turns, and the auxiliary winding may have a conductor (coil) diameter of 1.15 mm and 80 turns. On the other hand, the main winding according to an embodiment may have a conductor (coil) diameter of 1.15 mm and a total of 176 turns, and the auxiliary winding may have a conductor (coil) diameter of 1.10 mm and 86 turns. Accordingly, at the first load (first mode), the first main winding and the second main winding may be connected in series, so that the number of turns actually operated by the main winding is increased to 176 turns, thereby improving operating efficiency.

In addition, the first main winding may be configured to have the number of turns corresponding to 70 to 95% of the number of turns (total number of turns) of the main winding. Accordingly, when the first main winding and the second main winding are disconnected at the second load (second mode), operating efficiency at the second load may be increased due to a decrease in the number of turns of the main winding.

The first main winding may be configured to have 132 to 167 turns, and the second main winding may be configured to have 9 to 44 turns. Moreover, the first main winding may have 150 to 159 turns, and the second main winding may have 17 to 26 turns. The first main winding may have the number of turns corresponding to 85 to 90% of the number of turns of the main winding.

The winding changeover switch may be configured to switch the mode when the output (set value) of the electric motor 2400 to 2800 W. The first main winding may have the number of turns of 90% corresponding to the number of turns of the main winding. The winding changeover switch may be configured to switch the mode when the output (set value) of the electric motor is 2700 to 2800 W.

The stator coil may further include a capacitor connected to the auxiliary winding. The auxiliary winding may be 90° ahead an electrical angle of the main winding 350, namely, the auxiliary winding 360 and the main winding 350 may differ in phase (phase difference) by 90°.

The rotor may include a rotor core coupled to the rotational shaft, a plurality of conductor bars axially coupled to the rotor core, and a shorting ring provided at an end of the rotor core and configured to provide electrical connection between the plurality of conductor bars. This may allow the rotor to be rotated with a predetermined slip.

According to another embodiment, a compressor may be provided therein with a hermetically sealed accommodation space, a compression unit provided inside of the case to compress a fluid, and the electric motor provided inside of the case and configured to provide a drive force to the compression unit. The winding changeover switch of the electric motor may be provided inside of the sealed case. Thus, a switch or circuit that switches the main winding may not be separately provided at an outside of the case, achieving a simple configuration.

Embodiments may include one or more of the following features or features discussed above with respect to the electric motor. For example, operating efficiency at a relatively low first load (actual load) may be increased by dividing the main winding of the stator coil into a plurality of windings to be opened and closed by the winding changeover switch. An additional capacitor may not be required as the stator coil is not provided with a capacitor that switches the main winding other than a capacitor connected to an auxiliary winding.

When the rotor is at a stop or stationery, the plurality of main windings of the stator coil may be connected in series so as to increase the number of turns of the main winding. When an output of the electric motor reaches a preset or predetermined value, the plurality of main windings may be disconnected from each other so as to reduce the number of turns of the main winding. This may not only allow operating efficiency at the first load (actual load included), which is a relatively low load, to be increased, but also operating efficiency at a second load (overload included) greater than the first load to be improved. Accordingly, operating efficiency at the first load (including the actual load) and the second load (including the overload) may be increased, so that operating efficiency of the electric motor may be improved in overall.

A switch and a circuit unit may not be separately provided at an outside the case of the compressor as the winding changeover switch is disposed inside of the compressor case defining a sealed space therein. This may result in a simpler configuration and ease of manufacturing.

The main winding may include a first main winding and a second main winding. The first main winding may be configured to have the number of turns corresponding to 75 to 95% of the total number of turns of the main winding, so that operating efficiency may be increased at both the first load (actual load Included) and the second load (overload included) which is greater than the first load.

In the foregoing, embodiments have been shown and described. However, embodiments may be embodied in various forms without departing from the spirit or essential characteristics thereof, and accordingly, it is intended that the embodiment described above may not be limited by the detailed description provided herein.

Moreover, even if any embodiment is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric motor, comprising:
a stator having a stator core and a stator coil; and
a rotor provided with a rotational shaft and rotatably disposed with respect to the stator,
wherein the stator coil includes a main winding, an auxiliary winding connected to the main winding with a phase difference, and a capacitor connected to the auxiliary winding in series,
wherein the main winding is divided into a plurality of main windings so as to be connected to each other and disconnected from each other,
wherein the stator coil further includes a winding changeover switch configured to allow connection and disconnection between the plurality of main windings,
wherein the rotor includes a rotor core coupled to the rotational shaft and a plurality of conductor bars coupled to the rotor core,
wherein the main winding includes a first main winding and a second main winding, wherein the first main winding and the second main winding have a different number of turns,
wherein the first main winding and the second main winding comprise conductors each having a diameter smaller than a diameter of a conductor of a single main winding, and
wherein a sum of a number of turns of the first main winding and a number of turns of the second main winding is greater than a number of turns of the single main winding, and
wherein the number of turns of the first main winding is 70% to 95% of the number of turns of the main winding.

2. The electric motor of claim 1, wherein the winding changeover switch includes a fixed terminal and a movable terminal having a bimetal member configured to be elastically deformable during electrical connection.

3. The electric motor of claim 2, wherein one end of the first main winding is connected to the fixed terminal, and one end of the second main winding is connected to the movable terminal.

4. The electric motor of claim 3, wherein the fixed terminal includes a first fixed terminal to which the first main winding is connected and a second fixed terminal disposed to be spaced apart from the first fixed terminal.

5. The electric motor of claim 3, wherein the winding changeover switch is configured to:
connect the first main winding and the second main winding in series when the rotor is stationary; and
disconnect the first main winding and the second main winding from each other so that one of the first main winding or the second main winding is operated when an output reaches a predetermined value.

6. The electric motor of claim 5, wherein the winding changeover switch is configured to disconnect the first main winding and the second main winding from each other when the output is 1700 to 3100 W.

7. The electric motor of claim 6, wherein the winding changeover switch is configured to disconnect the first main winding and the second main winding from each other when the output is 2400 to 2600 W.

8. The electric motor of claim 1, wherein the number of turns of the first main winding is 85% to 90% of the number of turns of the main winding.

9. The electric motor of claim 1, wherein the first main winding has 132 to 167 turns, and the second main winding has 9 to 44 turns.

10. The electric motor of claim 9, wherein the first main winding has 150 to 159 turns, and the second main winding has 17 to 26 turns.

11. The electric motor of claim 1, wherein the number of turns of the first main winding is 85% to 90% of the number of turns of the main winding, and wherein the winding changeover switch is configured to disconnect the first main winding and the second main winding from each other when an output is 2400 to 2800 W.

12. The electric motor of claim 11, wherein the number of turns of the first main winding is 90% of the number of turns of the main winding, and wherein the winding changeover switch is configured to disconnect the first main winding and the second main winding from each other when the output is 2700 to 2800 W.

13. The electric motor of claim 1, wherein the winding changeover switch includes a tube defining an accommodation space therein.

14. The electric motor of claim 1, wherein the rotor
includes a shorting ring provided at an end of the rotor core and is configured to provide electrical connection between the plurality of conductor bars.

15. A compressor, comprising:
a case provided therein with a sealed accommodation space;
a compression unit provided inside of the case and configured to compress a refrigerant; and
the electric motor according to claim 1 provided inside of the case and configured to provide a drive force to the compression unit.

16. The compressor of claim 15, wherein the compression unit comprises with an orbiting scroll and a non-orbiting scroll configured to compress the refrigerant while moving relative to each other in an engaged manner.

17. The compressor of claim 15, wherein the winding changeover switch of the electric motor is provided inside of the case.

18. An electric motor, comprising:
a stator having a stator core and a stator coil; and
a rotor provided with a rotational shaft and rotatably disposed with respect to the stator, wherein the stator coil includes a main winding, an auxiliary winding connected to the main winding with a phase difference, and a capacitor connected to the auxiliary winding in series,
wherein the main winding includes a first main winding and a second main winding configured to be connected to each other and disconnected from each other,
wherein the stator coil further includes a winding changeover switch configured to allow connection and disconnection between the first main winding and the second main winding, the winding changeover switch including a fixed terminal, and a movable terminal configured to be elastically deformable during electrical connection, wherein the rotor includes a rotor core coupled to the rotational shaft and a plurality of conductor bars coupled to the rotor core, wherein the first main winding and the second main winding have a different number of turns, wherein the first main winding and the second main winding comprise conductors each having a diameter smaller than a diameter of a conductor of a single main winding, wherein a sum of a number of turns of the first main winding and a number of turns of the second main winding is greater than a number of turns of the single main winding, and wherein the number of turns of the first main winding is 70% to 95% of the number of turns of the main winding.

19. An electric motor, comprising:

a stator having a stator core and a stator coil; and a rotor provided with a rotational shaft and rotatably disposed with respect to the stator, wherein the stator coil includes a main winding, an auxiliary winding connected to the main winding with a phase difference, and a capacitor connected to the auxiliary winding in series, wherein the main winding includes a first main winding and a second main winding configured to be connected to each other and disconnected from each other, wherein the stator coil further includes a winding changeover switch configured to allow connection and disconnection between the first main winding and the second main winding, wherein the winding changeover switch is configured to:

connect the first main winding and the second main winding in series when the rotor is stationary; and disconnect the first main winding and the second main winding from each other so that one of the first main winding or the second main winding is operated when an output reaches a predetermined value, wherein the rotor includes a rotor core coupled to the rotational shaft and a plurality of conductor bars coupled to the rotor core, wherein the first main winding and the second main winding have a different number of turns, wherein the first main winding and the second main winding comprise conductors each having a diameter smaller than a diameter of a conductor of a single main winding, wherein a sum of a number of turns of the first main winding and a number of turns of the second main winding is greater than a number of turns of the single main winding, and wherein the number of turns of the first main winding is 70% to 95% of the number of turns of the main winding.

\* \* \* \* \*